MEMORY SYSTEM HAVING ASSOCIATIVE CELLS FOR MARKING LOCATIONS

Original Filed Nov. 8, 1962 4 Sheets-Sheet 1

INVENTOR
EDWIN S. LEE, III
BY Christie, Parker & Hale
ATTORNEYS

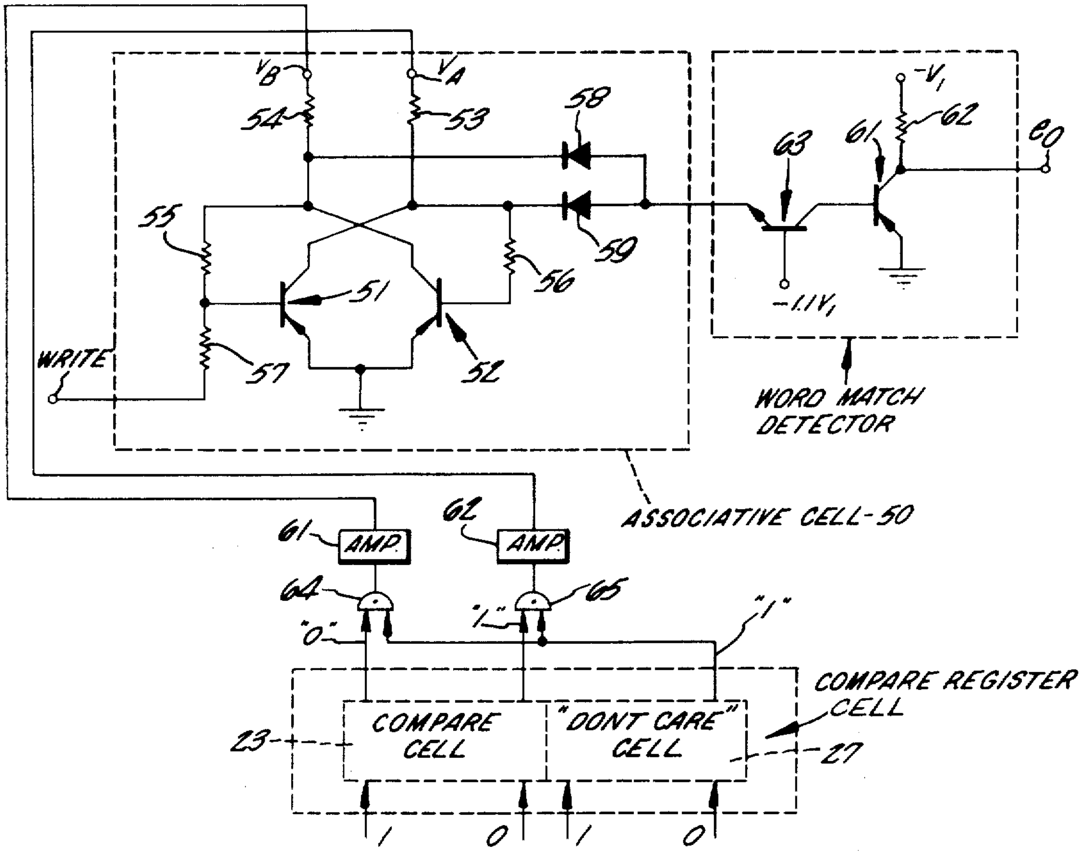
FIG. 5
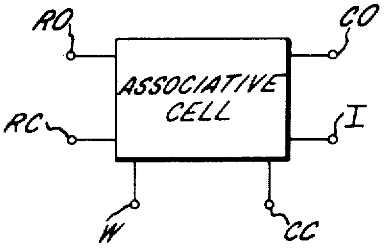
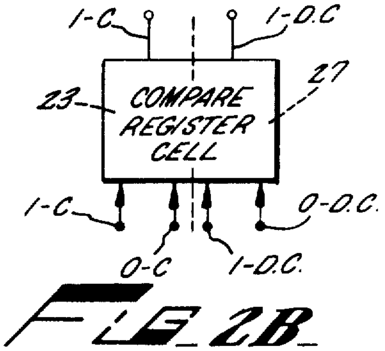
FIG. 2A FIG. 2B
INVENTOR
EDWIN S. LEE, III
BY
Christie, Parker & Hale
ATTORNEYS

| COMPARE CELL INFORMATION CONTENT | | ASSOCIATIVE CELL INFORMATION CONTENT | ASSOCIATIVE CELL OUTPUT SIGNAL |
|---|---|---|---|
| 0 | 0 | 0 | 0 - TRUE |
| 0 | 0 | 1 | 1 - FALSE |
| 1 | 0 | 0 | 1 - FALSE |
| 1 | 0 | 1 | 0 - TRUE |
| 0 | 0 | 0 | 0 - TRUE |
| 0 | 0 | 1 | 0 - TRUE |
| 1 | 1 | 0 | 0 - TRUE |
| 1 | 1 | 1 | 0 - TRUE |

INVENTOR
EDWIN S. LEE, III
BY
Christie, Parker & Hale
ATTORNEYS

MEMORY SYSTEM HAVING ASSOCIATIVE CELLS FOR MARKING LOCATIONS

INVENTOR.
EDWIN S. LEE, III
BY Christie, Parker & Hale
ATTORNEYS

United States Patent Office 3,555,515

Patented Jan. 12, 1971

3,555,515

MEMORY SYSTEM HAVING ASSOCIATIVE CELLS FOR MARKING LOCATIONS

Edwin S. Lee III, Claremont, Calif., assignor to Burroughs Corporation, Detroit, Mich., a corporation of Michigan Original application Nov. 8, 1962, Ser. No. 236,310, now Patent No. 3,417,265, dated Dec. 17, 1968. Divided and this application June 27, 1968, Ser. No. 740,660

Int. Cl. G11c *15/00*

U.S. Cl. 340—172.5 6 Claims

ABSTRACT OF THE DISCLOSURE

Apparatus for locating and writing in an empty memory location of an associative memory. An extra cell is added to each memory location to mark the location as full or empty.

CROSS-REFERENCES TO RELATED APPLICATIONS

This is a division of application Ser. No. 236,310 filed Nov. 8, 1962, which issued on Dec. 17, 1968 as Pat. No. 3,417,265.

BACKGROUND OF THE INVENTION

Field of the invention

This invention relates to memory systems and more particularly to improved associative memory systems and associative cells therefor.

Description of the prior art

Associative memories have been developed whereby the information stored in the memory system may be obtained without any indication of the physical location of a particular piece of information in the memory system. These memory systems are also known as content addressed memory systems. In all these systems the contents of all of the memory elements are simultaneously compared to determine whether a piece of information or a word of information that is undergoing comparison is contained in the memory and, if so, an indication as to the location of the memory so as to allow the particular location to be operated on either for reading or writing purposes. A number of these memories have been described and reported and, generally, these systems have been implemented in terms of associative cells which utilize elements such as cryogenic elements or magnetic circuits. The use of cryogenic elements requires low temperatures for their operation while the magnetic circuits generally have been found to be limited in the size of the words and the number of words that may be associatively handled due to the signal to noise ratios that are involved. Furthermore, these techniques not only have practical problems but are expensive to manufacture and have not been incorporated into most computer systems.

A circuit technique that has been developed that is adaptable to high volume at low unit costs involves the deposition of complete circuits on a substrate, including the transistors and the associated circuit elements into single integrated modules. Accordingly, an associative memory system that may be implemented in terms of circuit elements that may be readily adaptable to these integrated circuit techniques is highly desirable.

The application discloses an improved associative memory system employing improved solid state associative cells that may be readily manufactured as an integrated circuit to render the memory system inexpensive to construct. The solid state associative cells of the present invention provide signal to noise ratios that are of a magnitude greater than that for magnetic associative cells and that may be operated at multi-megacycle rates. Furthermore, the associative cells of the present invention provide essentially equal input and output signal levels whereby the noise problems in large memory systems are minimized. The solid state associative memory system has the further characteristic that a "don't care" condition may be utilized whereby partial field searches may be derived.

SUMMARY OF THE INVENTION

The above-identified application Ser. No. 236,310 is directed to an associative memory cell disclosed herein and a "don't care" characteristic of the cell and system. The present invention is directed to the provision of an additional cell in each memory location to mark the memory locations as full or empty.

Briefly, a data procssing system embodying the present invention comprises a memory having a plurality of storage locations therein. Each memory location contains cells for storing a word of information and an additional cell, the storage content of which identifies the corresponding memory location as full or empty.

Briefly, a method in accordance with the present invention is for locating a location in an associative memory system having a compare register, a cell being reserved in each memory location of the memory and in the compare register for marking a storage location from which information has been read. The steps comprise setting a predetermined condition into the reserved compare cell, associatively interrogating for a correspondence the reserved associative cells with the content of the reserved compare cell to cause a signal to be formed by the associative memory indicative of the corresponding storage location.

BRIEF DESCRIPTION OF THE DRAWINGS

These and other features of the present invention may be more fully appreciated when considered in the light of the following specification and drawings, in which:

FIG. 2A is a block diagram representation of the associative cell of FIG. 2;

FIG. 2B is a block diagram representation of a compare register cell for the compare register of FIG. 2;

FIG. 5 is a schematic block diagram of a modified associative cell.

DESCRIPTION OF THE PREFERRED EMBODIMENTS

Figure 1:
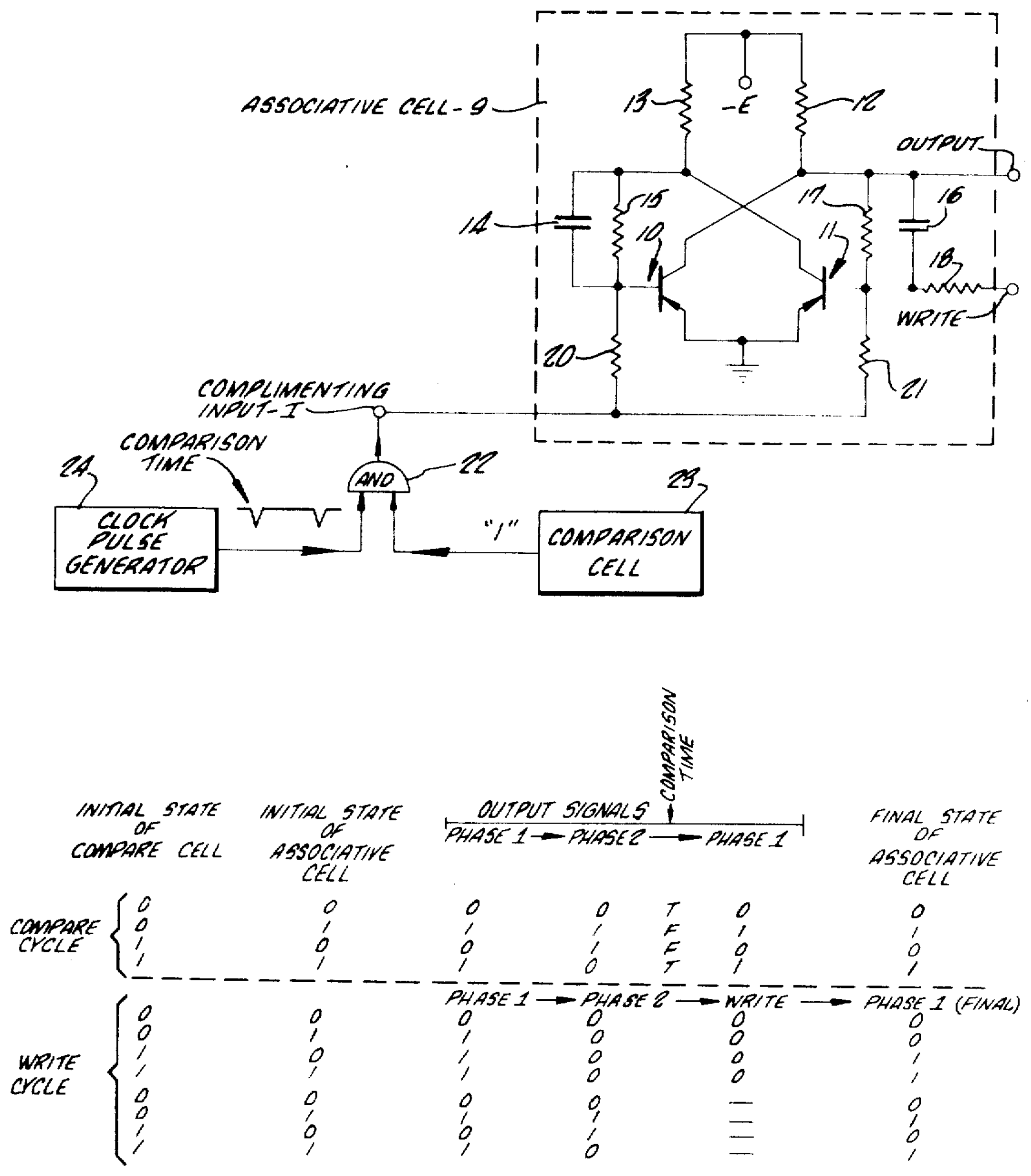
FIG. 1 is a schematic diagram of the basic associative cell and the control arrangement embodying the invention and includes a truth table for the associative cell.

Now referring to FIG. 1 the structure of the basic associative memory cell of the present invention will be described. The associative memory cell 9 comprises a two transistor switching element commonly referred to as a flip-flop. The flip-flop is preferably of the complementing type of flip-flop wherein it is provided with an input terminal that complements or inverts the state of the flip-flop in response to an input pulse.

Specifically, the memory cell comprises transistors 10 and 11 connected in a symmetrical regenerative relationship to have two stable states. The emitters of the transistors 10 and 11 are connected directly to ground while the collectors are connected through a voltage dropping resistor to a point of negative potential. The collector for the transitsor 10 is connected to the negative potentail by means of a resistor 12 while the collector for the transistor 11 is connected to the same terminal by a similar resistor 13. In the same fashion, the base electrodes are symmetrically connected to this same negative voltage terminal through the resistors 12 and 13 by means of individual resistor-capacitor parallel circuits. The base electrode for the transistor 10 is connected to the positive end of the resistor 13 by means of the parallel combination of the capacitor 14 and the resistor 15. In the same fashion the base electrode for the transistor 11 is connected to the positive terminal of the resistor 12 by means of a parallel combination of a capacitor 16 and a resistor 17. The base electrode for the transistor 11 is also provided with a series dropping resistor 18 having one terminal identified as the write terminal or W terminal for the memory cell 9 and will be explained more fully hereinafter. A complementing input terminal, I, is also provided for the associative memory cell 9 which is symmetrically connected to the base electrodes for the transistors 10 and 11 through the dropping resistors 20 and 21 respectively. The state of the associative cell 9 is indicated by an output terminal connected directly to the collector electrode for the transistor 10.

The first stable state of the associative memory cell 9 will be referred to as the 1 state and corresponds to the conductive condition of the memory cell wherein the transistor 10 is fully conducting, or in saturation. When the transistor 10 is fully conducting its collector voltage is more positive than a −0.25 volt. As a result of this voltage arrangement the current is prevented from flowing in the base circuit of the transistor 11 and therefore it is placed in a non-conductive condition. With the transistor 11 in a non-conductive condition the base current is drawn from the transistor 10 through the resistor dividing network provided by the resistors 13 and 15 which are serially arranged with the negative voltage terminal, −E. With these voltage conditions prevailing, the transistor 10 is maintained in its fully conducting or saturated conductive condition. The second or the other stable state of the associative memory cell 9 is identified as the 0 state and is the state wherein the transistor 11 is fully conducting and the transistor 10 is cut off. The collector voltage of the transistor 10 is significantly negative when these conditions prevail.

To the same end, the write terminal can be used to set the memory element to either stable state. If a negative voltage is applied to the write terminal, the transistor 11 is turned on regardless of the initial state of the transistors 10 and 11 and, therefore, after such a voltage pulse occurs the memory element 9 will be in the 0 state. Similarly, if a sufficiently positive pulse is applied to the write terminal, the transistor 11 will be cut off and the memory element 9 will be set to the 1 state. If a voltage pulse, positive or negative, of proper amplitude and duration is applied to the complementing input terminal I, the state of the memory element will be complemented, that is, if the memory element was in the 1 state prior to the reception of the complementing input pulse it will be in the 0 state after the pulse, or vice versa.

The output state of the associative memory cell 9 is defined as true when the transistor 10 is cut off or when the cell is in the 0 state, and is defined as being false when the transistor 10 is fully conducting or the cell is in the 1 state.

The complementing input terminal I is further shown connected to the output circuit of a control gate shown as an AND gate 22. The AND gate 22 is a two input AND gate having one input connected directly to the 1 output circuit of a comparison cell 23. The comparison cell 23 may be considered for the present purposes as a conventional bistable element or flip-flop providing static or voltage state output signals. The comparison cell 23 stores the information to be compared with the information stored in the associative cell 9, in this instance a single binary bit. The other input circuit for the AND gate 22 is directly connected to a clock pulse generator 24 that provides negative output pulses at preselected intervals, as will become more evident immediately hereinafter.

With the above structure in mind, the comparison operation of the associative cell 9 will be described. In any associative system it is desired to have a matching output indication when the information content of the associative cell is the same as the information undergoing comparison and a mismatching output indication if the two pieces of information do not match. In addition, this problem is involved by the further requirement that the associative cell have a non-destructive characateristic, that is, that the stored information in the associative cell not be destroyed as a consequence of the comparison operation. For the purposes of the present invention, a matching output indication will be indicated by the production of a true, T, output signal at the output terminal of the associative cell 9, and a mismatching indication by a false, F, signal at this same terminal. These requirements are met by the associative cell 9 by cycling the cell through two phases, identified as Phase I and Phase II. Phase I of the present system exists when the associative cell 9 is in its normal storage condition or when the true or false state of the cell is determined solely by its information content. Phase II of the associative cell exists after the associative cell 9 has been operated on and the cell assumes a state that is dependent upon the information stored therein and the information stored in the comparison cell. After the arrival of the first clock pulse from the clock pulse generator 24, the associative cell 9 is considered to be in Phase II and after the second clock pulse it is considered to be back in Phase I. It should be noted that the states of the associative cell 9 during both Phase I and Phase II are static and the cells remain in their respective states until they are operated on or are switched to the other phase.

The cycle of operation for performing a comparison between the information stored in the comparison cell 23 and the associative cell 9 is that initially the associative cell is in Phase I and is then operated on to place it in Phase II during which time the comparison is effected and at a later time the cell 9 is operated on once again to return it to Phase I wherein the associative cell assumes its original state or, stated differently, the original information is regenerated in the cell whereby it exhibits the desired non-destructive characteristic.

Now assuming that the initial state of the comparison cell 23 is 0 and that the corresponding state of the associative cell 9 is 0, the comparison operation will be examined in more detail. It will be noted that when the first clock pulse provided by the clock pulse generator 24 is applied to the AND gate 22 the complementing input terminal I is not energized since the logical input conditions for the AND gate 22 are not met because the comparison cell 23 stores a 0. Therefore, the output state of the associative cell 9 is the same for both Phase I and Phase II, and a true output indication is produced. The second clock pulse provided by the clock pulse generator 24 is utilized to switch the associative cell 9 from Phase II back into Phase I and, accordingly, its arrival at the AND gate 22 will again be ineffective to change the state of the associative cell 9. The same conditions prevail when the comparison cell 23 stores a 0 and the associative cell 9 stores a 1 relative to the change of state of the cell 9 during the two phases, that is, a false output will be indicated from the associative cell 9 in both Phases I and II. Since by definition, the comparison is effected in the cycle of operation during Phase II it will be seen that the correct output indications are derived from the cell 9 when the comparison cell 23 stores a 0 and the cell 9 stores a 0 and 1 respectively, namely, a true and false output indication.

Now assuming that the comparison cell 23 stores a 1 and the associative cell 9 a 0, it will be noted that upon the arrival of the first clock pulse from the clock pulse generator 24 that the complementing input terminal I of the associative cell 9 will be energized and the associative cell 9 will assume a 1 state during Phase II or provide a false output signal. Accordingly, it will be noted once again that under the assumed storage conditions the false output signal is correctly related to a mismatch. Subsequently, the second clock pulse from the clock pulse generator 24 arrives at the AND circuit 22 and, since the state of the comparison cell 23 has not been changed, the associative cell 9 will once again be complemented and thereby be returned to its original 0 state whereby its output terminal indicates it is in a true state. In the same fashion, when both the comparison cell 23 and the associative cell 9 store a 1, the first clock pulse from the clock pulse generator 24 will complement the associative cell 9 to place it in the 0 state whereby the output terminal during Phase II indicates a true output, or a match, as is required. Once again, upon the arrival of the second clock pulse the associative cell 9 is recomplemented to return it to its initial 1 state restore it to its correct false state.

The sequence of operations for writing into the associative cell 9 will now be considered. It should be noted at the outset that the information to be written into an associative cell is first stored in a comparison cell 23 and the above described comparison cycle is initiated to write the information into the associative cell 9.

Prior to the first clock pulse from the clock pulse generator 24 the proper information is written into the comparison cell 23. Consider first the writing routine when a "1" is written into comparison cell 23. After the information is stored in the comparison cell 23 the first clock pulse provided by the generator 24 is generated. Immediately after this clock pulse is generated the write terminal of the associative cell 9 is pulsed so as to set the cell to 0. Subsequently the second clock pulse from the clock pulse generator 24 is effective to complement the associative cell 9 since the comparison cell is storing a 1. With the associative cell 9 previously switched to the 0 state, the second complementing input pulse places it in the 1 state and the write cycle is completed. It will now be seen that both the associative cell 9 and the comparison cell 23 store a 1 and that a false output indication is provided at the output terminal of the associative cell 9, indicating that a 1 is stored in cell 9.

It will be further appreciated from a more detailed review of the truth table for the write cycle accompanying FIG. 1 that when the comparison cell 23 stores a 0 the clock pulses from the clock pulse generator 24 are ineffective to complement the associative cell 9 and when the write terminal is energized to place the cell 9 in the 0 state that it remains in this state throughout the remainder of the write cycle whereby both the associative and comparison cells store a 0 at the end of the write cycle. It will also be noted that the initial state of the associative cell is not significant in this writing routine since it is essentially erased by the energization of the write terminal and that the final state of the cell 9 depends upon the information content of the comparison cell 23 as to whether the associative cell 9 is complemented or not at the time of the second clock pulse from the clock pulse generator 24. Also, if during this write cycle the write terminal is not energized or pulsed, the associative cell 9 will return to its initial state. This is more evident if it is assumed that the associative cell 9 stores a 0 and the comparison cell 23 stores a 1. It will be recognized that under these conditions the associative cell 9 is complemented twice so that in the absence of the write signal it is returned to its initial state and also that the same information is not necessarily stored in the comparison cell 23 and the associative cell 9.

In some operations it is necessary to examine only a portion of a word or a single bit thereof to determine whether a match or a mismatch exists and, accordingly, it is desirable to provide an associative cell that may be used in this fashion—specifically a cell that may be set to a "don't care" state whereby it produces a matching or true output signal regardless of the relative state of the associative cell and the compare cell. In accordance with the present invention, this "don't care" feature is provided by modifying the compare register to include a separate "don't care" cell that may be controlled for searching under these conditions. The output voltage from the "don't care" cell is applied to a corresponding "don't care" element connected to control the output state of the basic associative cell 9 described hereinabove to produce the necessary true output therefrom whenever the "don't care" cell of the compare register is switched into the "don't care" state. This implies that the "don't care" cell may have a normal state as well as a "dont care" state. In the normal state the voltage derived from the "don't care" cell is ineffective to change the output state of the associative element and its output state then depends solely on its actual storage state at any one time. In conjunction with the above description of the two phase system, it should be noted that the "don't care" implementation of the basic associative cell is arranged to provide the necessary true output during Phase II for the purposes of comparison without losing the information in either the associative cell or the compare cell. This is true since the controls for the compare cell and the "don't care" cell are independently controlled and the information from the computer control is not lost. In order to determine the state of a compare cell, then, it is necessary to examine both the compare cell and its associated "don't care" cell. When the "don't care" cell is switched into its normal state, then, the state of the compare cell and the operation of the corresponding associative cell functions as described hereinabove. However, when the "don't care" cell is arranged in the "don't care" state, the state of the corresponding compare cell may be considered to be a masked zero, Ø, or a masked one, *I*. These symbols, then, will indicate the true state of the compare cell when the "don't care" state is set up in the compare register. Specifically, a Ø or a *I* will be identified with the line therethrough to indicate that the corresponding "don't care" cell is in the "don't care" state. For the purposes of the invention, then, a compare cell of the compare register should be considered as comprising a compare cell and its associated "don't care" cell when the associative cell is considered to include the "don't care" feature.

Figure 2:
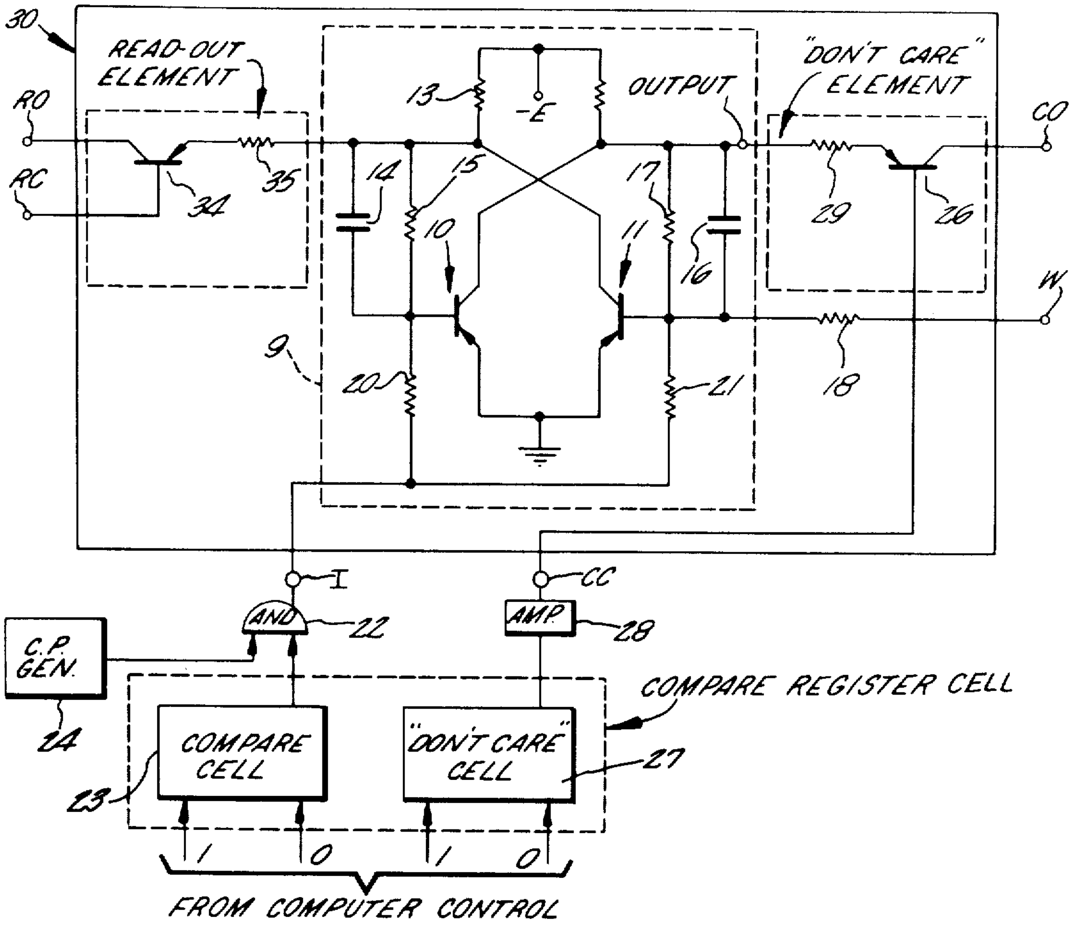
FIG. 2 is another embodiment of an associative cell and a compare register cell along with its truth table.

The "don't care" element is connected to the normal output terminal of the associative cell 9. The "don't care" element is shown in FIG. 2 as comprising a transistor switching element 26 having its base electrode connected to the 1 output of a "don't care" cell 27 of the comparison register through an amplifier 28. The emitter electrode of the "don't care" transistor 26 is connected directly to the output terminal of the associative element 9 by means of a voltage dropping resistor 29. The collector electrode functions as the output terminal of the "don't care" associative element 30 and is identified by the letters CO.

Now examining the associative cell 30, including the "don't care" element, it will be noted that under normal operating conditions where the output level of the cell is a function of the state of the associative cell 9 that the "don't care" cell 27 will be in its normal state and, therefore, the voltage at the base electrode as applied to the terminal CC of the "don't care" element 26 is a negative voltage, on the order of two volts. When these operating conditions prevail, the transistor 10 is in current saturation and the voltage at the output terminal of the associative cell 9 is close to ground potential. This voltage is applied to the resistor 29 of the "don't care" element and, therefore, a current flow is realized in the emitter circuit of the "don't care" transistor 26. This current is available at the collector of this same "don't care" transistor 26. This "don't care" element then is effective to reproduce the desired false output from the associative cell 9 that corresponds to the transistor 10 being in a saturated condition and the "don't care" associative cell 30 produces a false output. Alternatively, when the transistor 10 is cut off, the voltage applied to the "don't care" element is more negative than two volts so that the "don't care" transistor 26 is cut off and no current is available at the output terminal CO. This, then, corresponds to the true state of the associative element 9 and the associative cell 30 provides a true output indication.

When the "don't care" cell 27 is switched to the 1 state whereby the voltage applied to the base electrode of the "don't care" transistor 26 is at ground potential rather than the negative potential and, as a result, the "don't care" transistor 26 is cut off irrespective of the storage state of the associative cell 9. Under these voltage conditions, then, the output signal at the terminal CO is always true since no collector current is available. Essentially, then, the "don't care" element masks the actual state of the associative cell 9 and always produces a true output from the associative cell 30 when it is in the masking or "don't care" state.

Now considering the operation of a compare cell 23 including the "don't care" cell 27, it will be recalled that when the "don't care" cell 27 is in the 0 or normal state that the operation of the associative cell is identical to that described in conjunction with FIG. 1 hereinabove. When the signals from the computer control include a signal to switch the "don't care" cell 27 to the 1 or "don't care" state, the "don't care" element of the associative cell 30 is activated to produce a true output signal without reference to the actual storage state of the associative cell. When a plurality of associative elements 30 store a word and at least one of the signals in the compare register is masked or its associative "dont care" cell 27 is in the "don't care" state, a comparison may be effected on the remaining information or bits of the word to determine whether they match or not.

Figure 3:
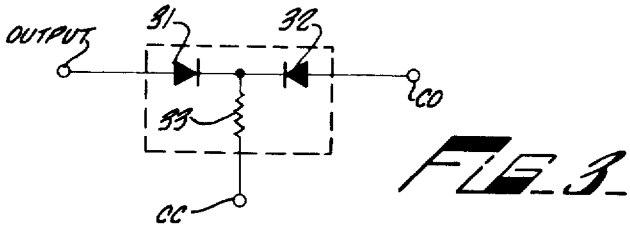
FIG. 3 is an alternate "don't care" element for use with the associative cells of FIGS. 1 and 2.

An alternative "don't care" element is shown in FIG. 3 and comprises a pair of series connected back-to-back diodes 31 and 32 with the illustrated left-hand diode 31 having its anode electrode connected to the output terminal of the associative cell 9 while the anode electrode for the right-hand diode 32 is directly connected to the CO terminal or the output terminal for the associative cell 30. Intermediate the cathodes of the diodes 31 and 32 there is connected a dropping resistor 33 which has its opposite end connected to the CC terminal of the associative element 30.

In the embodiment of the "don't care" element of FIG. 3 the operation is essentially the same as that previously described in that when the "don't care" cell 27 is in the normal mode the voltage applied to the CC terminal is a negative voltage, in this instance on the order of 12 volts, and the state of the output signal from the associative cell 9 is not changed. In the "don't care" state the potential applied to terminal CC is at ground level, or a positive potential, and will always produce a true output signal. In this embodiment of the "dont' care" element, the aforementioned voltage relationships are such that a true output signal results whenever diode 32 is back-biased since the output terminal CO is connected to a point of negative potential. In the same fashion, a false output is produced when the diode 32 conducts.

Another aspect of the associative cell shown in FIG. 2 is the read-out element shown connected to one of the output electrodes of the associative cell 9. The read-out element is utilized to interrogate the state of the associative cell 30 and to provide a signal corresponding to the actual state thereof at the time of interrogation. To this end, the read-out element comprises a switching circuit in the form of a transistor switching circuit essentially similar to the "don't care" element previously described. In this instance the emitter electrode for the transitsor 34 of the read-out switch is connected to the positive side of the resistor 13 through a dropping resistor 35. The collector electrode of the transistor 34 is used as the read-out output terminal and is identified as RO. The base electrode of transistor 34 is directly connected to the terminal RC for controlling the conductive condition of the transistor for reading or interrogation.

The RC terminal is normally arranged at ground potential to provide a true output signal at terminal RO when the associative cell 9 is not being interrogated. Under these conditions there is no current flow through the read-out transistor 34 to the terminal RO due to the potential on the base electrode. It will be noted that this corresponds to the "don't care" state of the "don't care" element previously described. When the RC terminal is pulsed, the potential applied thereto allows the read-out transistor 34 to conduct or not to conduct in accordance with the state of the associative cell 9. Accordingly, when the cell 9 is in the false state or is storing a 1, a current flows to the output terminal RO to provide a false read-out signal. Similarly, when the cell 9 stores a 0, no current flows through the read-out transistor 34 to the terminal RO and, therefore, it indicates a 0 or a true state as the storage statte of the associative cell 9.

Now referring to FIG. 2A wherein a block-schematic diagram of the associative cell 30 of FIG. 2 is represented. The associative cell 30 is illustrated with the six terminals described in conjunction with FIG. 2 and will be utilized for purposes of simplifying the description of the associative memory system. To this end, it will be noted that the terminals are similarly identified in FIGS. 2 and 2A wherein the CO terminal identifies a compare output terminal or the terminal that must be sensed to determine a match or mismatch. The W terminal is the write terminal for writing 0's into the cell 30 while the CC terminal is the terminal to which the potentials from the "don't care" comparison cell 27 are applied to control the "don't care" element of the associative cell 30. The I terminal is the complementing input terminal, while the RC terminal controls the read-out element 34, and its related RO terminal is the read-out terminal for the cell 30.

In the same fashion, FIG. 2B illustrates the equivalent block diagram of a compare register cell described in conjunction with FIG. 2. The compare register cell shown in FIG. 2B comprises the compare cell and the "don't care" cell and is shown with the two input terminals for each portion of this compare register cell and the output terminals for each portion. To this end, the compare cell 23 is shown with its 1 and 0 input terminals labelled 1–C and 0–C respectively. The output terminal for this compare cell 23 is identified as 1–C. In the same fashion the 1 and 0 input terminals for the "don't care" cell 27 of the compare register are respectively identified as 1–DC and 0–DC, while the corresponding output terminal is identified as 1–DC.

Figure 4A:
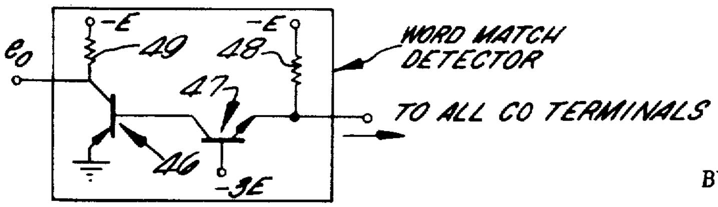
FIG. 4A is a schematic diagram of a typical word match detector for the system of FIG. 4.
Figure 4:
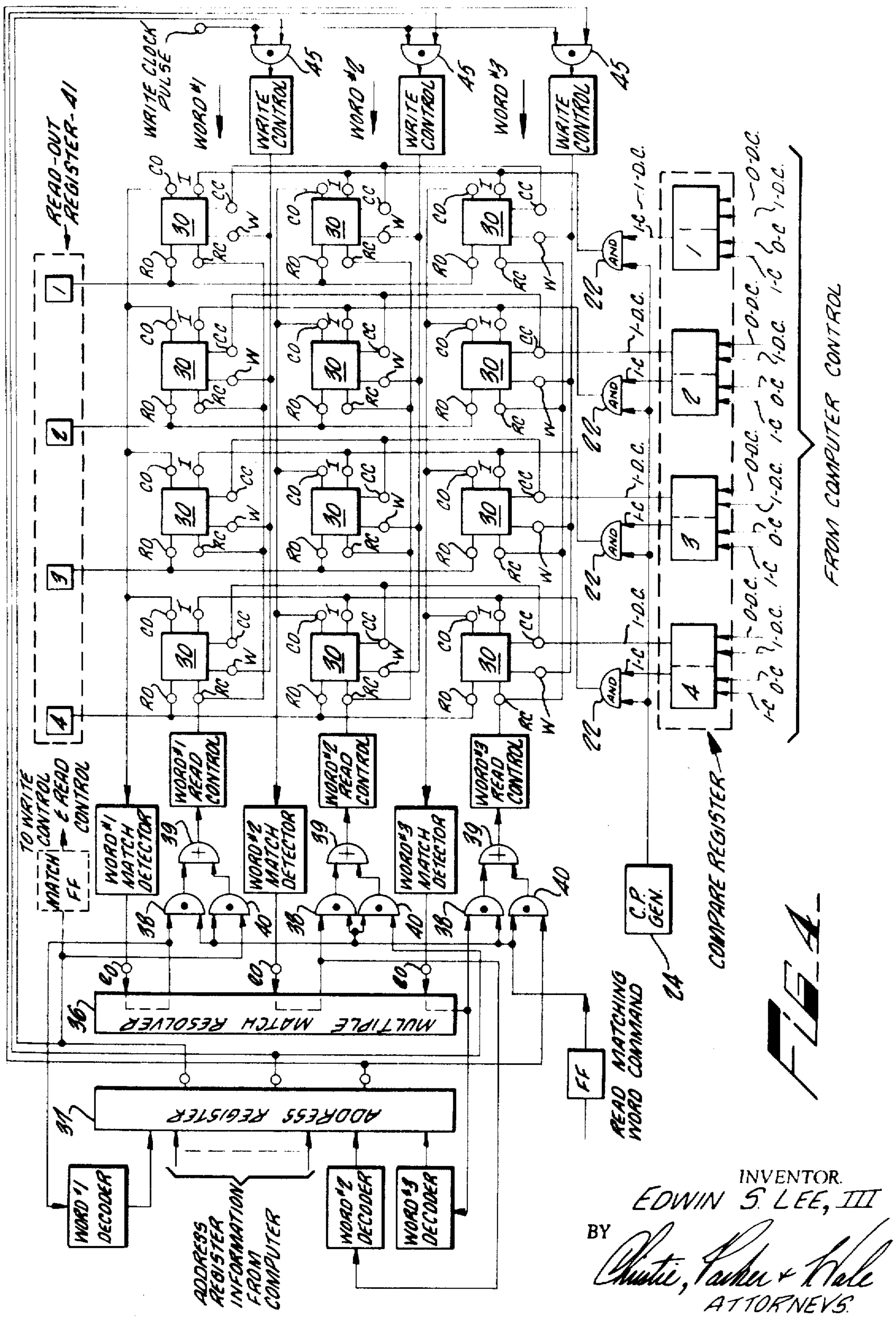
FIG. 4 is a schematic block diagram of an associative memory system incorporating the associative cells of the invention.

Now referring to FIG. 4 the arrangement of an associative memory system implementing the associative cell and the compare register cell illustrated in FIGS. 2A and 2B will be described. The associative memory system is illustrated for three words of four binary bits each. The words are arranged in rows and the bits of the same order of significance are arranged in the same column, as illustrated.

Since the system is implemented in accordance with the associative cell described hereinabove, in order to indicate a matching word each CO terminal of the associative cell for a word must produce a true output signal in order that there be a match. Accordingly, each word in the memory is provided with a word match detector to which each of the CO terminals are connected. A typical word match detector for use in the system of FIG. 4 is illustrated in FIG. 4A. The word match detector comprises a pair of transistors 46 and 47 of opposite conductivity type. The emitter electrode of the transistor 47 is connected through a dropping resistor 48 to a point of negative potential shown as −E. The emitter electrode is also directly connected to all of the CO terminals of the associative cells 30. The base electrode for the transistor 47 is connected to a point of negative potential shown as −3E. The collector electrode for the transistor 47 is connected directly to the base electrode for the transistor 46 while the emitter electrode for this same transistor is connected directly to ground. The collector electrode for the transistor 46 is connected by means of a dropping resistor 49 to a point of negative potential shown as −E. The collector electrode for the transistor 46 is connected to the output terminal $e_0$ functioning as the output terminal for the word match detector.

As was indicated hereinabove, in order that there be a match all the associative cells 30 for a word must produce a true output, that is, a true output must appear at all of the CO terminals and under these conditions no current is available from the associative cells 30 but the transistor 47 does conduct and current flows through the emitter resistor 48 and, in turn, places the transistor 46 into current saturation and the output terminal $e_0$ of the word match detector near ground potential. When the $e_0$ terminal is at ground potential, a true output or a match is indicated as is desired. When at least one of the CO terminals produces a false output, that associative cell provides a current flow into the emitter resistor 48 associated with the transistor 47 to cut off the transistor 47 and, in turn, the transistor 46 is cut off. When the transistor 46 is cut off its collector potential assumes a negative voltage level and thereby causes a false output signal to be derived at the $e_0$ output of the word match detector. This once again will logically correspond to a mismatch.

Each word in the memory system is provided with an individual word match detector connected as illustrated and described. Furthermore, each word match detector is connected to a multiple match resolver shown in block form and identified by the reference numeral 36. The multiple resolver 36 resolves multiple matches that may result when operating in the associative form and may take the form of the multiple match resolver described and claimed in Pat. No. 3,398,404, entitled "Multiple Match Resolution in Associative Storage Systems" which issued on Aug. 20, 1968 and which is assigned to the same assignee as the present application. The function of the multiple match resolver 36 is to detect multiple matches and to resolve them by setting up priorities for the multiple matching locations to cause only a single location to be operated on at any one time. Accordingly, for the purposes of the present invention, the resolver 36 can be ignored and the description will proceed on the basis that only a single matching location exists.

The present memory is also arranged to allow information to be read out in the conventional fashion by means of its physical location or by an address. To this end, an address register is shown in block form and is identified by the reference numeral 37.

The read control terminal RC of the cell 30 is then controlled both from the address register 37 and the associative word match detectors for the corresponding word. To this end, each RC terminal is connected to the output of an individual word read control element and which individual word read control elements are placed in a read or non-read state by means of a control gating network. The control gating network comprises a two input AND circuit 38 connected to be responsive to a matching indication from the associated word match detector and a read matching word command that is provided by the central control of the computer. The output of this AND circuit 38 is connected directly to an OR circuit 39 for energizing the word read control. A second two input AND circuit 40 also has one of its inputs connected to the read matching word command flip-flop FF with its other input connected directly to the address register 37 for identifying a particular physical location. This control gating arrangement has been described in conjunction with word 1, however, it should be recognized that the identical gating arrangement is provided for the remaining words as is illustrated in FIG. 4.

It should be recognized that the address register 37 can be omitted when purely associative addressing is required. To implement this arrangement and neglecting the multiple match resolver 36, a bistable element can be connected to each word match detector to store a matching indication received from the corresponding word match detector. The output of this match storage element can then be utilized to activate the control gating for reading and writing. A typical matching storage element is shown in FIG. 4 in dotted outline.

Each RO terminal of an associate cell 30 arranged in the same column or having the same binary significance is connected in parallel circuit relationship and to an individual read-out cell for the read-out register 41, as illustrated. These read-out cells receive and indicate the storage state of each bit comprising a word upon the application of a read out command to the coresponding RC terminals.

First, considering the conventional location addressed reading cycle it will be recalled that the address of the physical location to be read is entered into the address register and when the read matching word command is generated the logical input conditions of the addressed AND circuit 40 are satisfied so that the corresponding output signal applied to the associated OR circuit 39 for the word read control at the desired address establishes the voltage on the RC terminal for all the associative elements of that word to provide a true or false signal at the RO terminals and which true and false signals are entered into the read-out register. The read-out register, then, may be strobed or sensed to determine the values of the bits or the word. The element that provides the read matching word command is also reset to place the memory system in condition for further operations.

Now the associative or content addressed reading operation will be examined in more detail. The sequence of operation for associatively reading out the memory system includes the step of entering the bits of a particular word into the compare register. In addition, the "don't care" information has to be entered into the compare register cells, and this may be effected by the computer control either simultaneously with the delivery of the word information to the compare register or this information may be entered in a serial fashion immediately after the word information is recorded. As mentioned hereinabove, immediately after the compare register is set up the first clock pulse from the clock pulse generator 24 arrives to place the memory system into Phase II for the purposes of comparing. The clock pulse is applied simultaneously to all the individual AND circuits 22 for a column along with the corresponding output state of the associated compare register cell, as illustrated. In the same fashion each of the "don't care" outputs, 1–DC, are connected in parallel circuit relationship to the individual CC terminals of the associative cells 30 arranged in the same column. With the system in Phase II a matching word will produce a true output at each CO terminal and, accordingly, a true output will be produced from the word match detector for the matching word. With the associative elements in condition to be compared, then the RC terminals are pulsed by having the read matching word command occur simultaneously with the true output from the word match detector to cause the input conditions for the associated AND circuit to be satisfied and its corresponding OR circuit to pulse the word read control element and thereby actuate the RC terminal. This, then, is effective to read out the bits of the matching word into the read-out register. After this sequence has occurred, the read-out register may be strobed to obtain the matching word. Subsequently the second clock pulse from the clock pulse generator 24 occurs to return the memory system to Phase I wherein each associative element once again stores the desired information.

Still considering the associative or content address reading, a partial field comparison will now be examined. Assume that the associative matrix of FIG. 4 at the location for word 1 contains the information 1 1 0 0, and 1 0 0 1 is stored at the location for word 2, and word 3 is 0 1 0 1 wherein the left-hand bits correspond to bit 4 and, progressing to the right, to bit 1. It will be assumed that it is desired to determine the character of the remaining bits of a word that have a 0 in bit position 4 and a 1 in bit position 3. To accomplish this, information is delivered to the compare register so that it reads as follows: 0 1 Ø Ø. It will be noted that the information stored in bit positions 1 and 2 indicate that the compare cell is in the 0 state and the associated "don't care" cell is in the "don't care" state. Accordingly, during any comparison of the associative cells 30 the cells corresponding to bits 1 and 2 will always produce a true output. After the compare register information is recorded, the system is placed into Phase II by the pulse from the generator 24. During Phase II the information represented by the storage state of the associative cells 30 will read as follows:

| | Storage state | | | | Output state | | | |
|---|---|---|---|---|---|---|---|---|
| Word: | | | | | | | | |
| 1 | 1 | 0 | 0 | 0 | 1 | 0 | 0 | 0 |
| 2 | 1 | 1 | 0 | 1 | 1 | 1 | 0 | 0 |
| 3 | 0 | 0 | 0 | 1 | 0 | 0 | 0 | 0 |

It will be recalled that an associative element 30 is complemented in response to a clock pulse only when the compare cell of the compare register is in the 1 state and, since the compare register cells for bit positions 3 is the only one storing a 1, it is the only column that is complemented and the other bit positions indicate the same state in both Phases I and II. Upon examination of the actual output states in connection with "don't care" it will be noted that words 1 and 2 mismatch in bit positions 3 and 4 and that only word 3 produces a matching output response in all bit positions. It will be noted that this is the correct output response even though the associative cells for word 3 record the bits 1 0 for the bit positions 1 and 2, they are masked by the "don't care" to produce true outputs so that for the purposes of comparison all of the associative elements of word 3 produce a true output indicative of a match. Accordingly, the read control circuit for word 3 will be actuated and the information content of the associative cells will be read out into the read-out register 41. However, when the read-out register 41 is strobed it will be seen that the word read out corresponds to the storage state of the associative elements 30 and will be 0 0 0 1. Since the comparison was performed on bits 4 and 3 only and were known to be 0 1, respectively, only the last two bit positions 2 and 1, respectively, need be derived from the read-out register 41 and the full word will be known to be 0 1 0 1. Subsequently, the memory system returns to Phase I and all the associative cells will have their initial information content.

It should also be noted that a particular problem results when a compare register has its corresponding compare cell in the 1 state and its associated "don't care" cell in the "don't care" state, or 1̸ is entered into a compare register cell. As mentioned hereinabove, with the compare cell in the 1 state in going from Phase I to Phase II the state of the corresponding associative elements are complemented and, accordingly, will produce an erroneous output in the read-out register if the above sequence is followed. In order to avoid this problem, it will be assumed that there is an inter-connection between the compare register cells and the read-out register cells whereby when the system is in Phase II and if a 1 or a 1̸ is stored in any bit position of the compare register, then in that bit position of the read-out register the output signal from the associative element will be inverted or complemented to compensate for the complementing of the associative element in passing into Phase II.

As described, for the purposes of reading from the memory system a writing operation may be effected on the associative memory system either by writing into a specified physical location or to write associatively into the memory system. To this end, the W, or write terminal, for each associative element 30 of a word is connected in parallel circuit relationship to a write control element for actuating the W terminal. A write control element is provided for each word and is further controlled by an individual AND circuit 45 having two inputs. One of the inputs of each of the AND circuit 45 of the write control elements is connected to a write clock pulse source (not shown). The remaining inputs for each of these circuits are individually connected to the address register to receive a signal identifying the corresponding physical location in the memory system. For example, the address signal received for word 1 would correspond to the binary coded signal 1 to identify the first horizontal row of associative elements and so on.

First considering the location addressed writing procedure. Initially the word to be written into the memory system is written into the compare register. The address at which this word is to be written into the memory system is written into the address register. The memory system is then placed into Phase II through the generation of the first clock pulse from the generator 24. After the associative elements 30 are placed in Phase II, a write pulse is applied to the AND circuits 45 for each of the write control elements and the only AND circuit that provides an output signal will be the one that has the address signal from the address register also applied thereto. Accordingly, each of the associative cells 30 having the designated address will be written into and be set to the 0 state. After this writing procedure the second clock pulse from the generator 24 occurs and places the associative cells back into Phase I. It should be recognized that at this time when a compare cell stores a 1 that the corresponding associative cell 30 at the designated address will be switched to the 1 state, and, also that the associative cells 30 that correspond to the compare cells that store a 0 will remain in the 0 state and therefore the associative and compare cells will match bit by bit and the new word will have been written into the memory.

The procedure for writing into the memory system by addressing the system associatively will now be described. It will be assumed that all the memory positions store a word and it will require the altering or erasure of a word already stored in memory for the acceptance of a new word. In general, the procedure requires the entry of the word stored in the memory system that is to be altered or erased to be entered into the compare register. The memory system is then placed into Phase II to determine the location of the word to be erased. This will produce a matching output indication from one of the word matching detectors and the match indicating signal will be applied to an individual decoder to generate a signal representative of the physical location of the matching word and which address signal is entered into the address register. The memory system is then placed into Phase I to return each of the associative cells 30 to their correct storage state. The new word to be written into the memory will then be stored in the compare register. The memory system is then once again placed into Phase II and then the write pulses are applied to the AND circuits 45 for the write control elements whereby all associative cells 30 are storing a 0. Upon the generation of clock pulse two the new word will be written into the designated address or at the location that produced the matching output previously and the system is in Phase I.

A better appreciation of this associative writing technique may be had through the consideration of a specific example thereof. To this end, it will be asumed that word 1 will contain the information 0 1 0 1, word 2 will be 1 0 0 1, and word 3 will be 1 1 1 1. Furthermore, it will be assumed that the word 0 0 0 1 is to be written in to the location for word 1 or that the present word 1, 0 1 0 1, is to be erased and this new word written in. Following the above procedure, then, the word to be altered, 0 1 0 1, is entered into the compare register with bits 1 and 4, reading from right to left respectively. Clock pulses are then generated from the generator 24 to place the memory system in Phase II and each associative cell 30 that corresponds to a compare cell that stores a 1 will be complemented and it will be seen that during Phase II word 1 will read 0 0 0 0 for the reason that bits 1 and 3 of word 1 will be complemented while the other bits will not be complemented. This then causes the word match detector for word 1 to emit a true signal since all the CO outputs produce a true output. Accordingly, the address register 37 will be provided with an address signal corresponding to address 1. Following the entry of the matching address signal into the address register 37 the memory system is returned to Phase I by the clock pulse and the information stored in the memory system is the same as that prior to the initiation of the above described steps. The result of operating in this fashion has produced the address of the word to be altered to be used in the subsequent operations for writing in the new word at this designated address.

Now the new word to be written into the memory system is entered into the compare register and, therefore, the compare register will read 0 0 0 1, reading from left to right as illustrated. The memory system is once again placed into Phase II and then a write pulse is generated whereby the write control element for word 1 will set all the associative cells 30 for this word to 0. The next clock pulse from the generator 24 will be effective to write the new word into the associative cells 30 for word 1. This is the same procedure as previously explained in that the compare cell storing a 1 will cause the associative cells to complement and leave the 0's on the 0 cells unaltered. Therefore, at the end of this writing cycle the memory information will read as follows:

Word 1—0 0 0 1
Word 2—1 0 0 1
Word 3—1 1 1 1

This will be seen to be the same information as originally stored in the memory system with the exception of the new word having been entered into the word 1 location.

Until certain circumstances it may be necessary to merely alter a portion of the word stored in memory. This may be accomplished by the associative writing technique described hereinabove and utilizing the "don't care" cell of the compare register. In general, this partial writing technique includes the step of entering all the bits of the new word into the compare register. In addition, those compare cells in the compare register that are not required for addressing purposes and are not to be altered are masked. Specifically, the associated "don't care" cells for these bits are placed in the "don't care" state. The memory system is then placed into Phase II to determine the location of the word having the matching bits in the correct positions and the corresponding address is derived and placed in the address register. The write pulse is then applied to cause the designated location to be written into whereby each of the corresponding associative cells 30 are placed in the 0 state. The system is then returned to Phase I, and then the "new word" is written into the memory system.

Specifically considering that the memory system stores the same information as described hereinabove for words 1, 2, and 3, namely the information 0 1 0 1, 1 0 0 1, and 1 1 1 1, respectively, and that the word that contains 0 1 in bits 4 and 3 is to be altered to have its last two bits read 0 1. This then, defines the new word as 0 1 0 1—the bits 1 and 2 to be altered and bits 3 and 4 to remain the same. This new word is entered into the compare register. Since bits 1 and 2 are not required for addressing purposes, they must be masked. Subsequently the "don't care" cells for bit positions 1 and 2 are placed in the "don't care" state so that the compare register reads as follows: 0 1 1 ∅.

The memory system is then sent into Phase II to determine the physical location of the matching word having the bits 0 1 in positions 4 and 3, respectively. It will be noted by examining the bit structure of the words stored in memory that only word 1 will produce a matching output since both words 2 and 3 will produce two mismatching signals in these bit positions. Since word 1 does produce a true output from each of its terminals CO due to the matching bits in positions 4 and 3 and the "don't care" signals from positions 1 and 2, the word match detector for word 1 produces a true output and the address register 37 will store the address signal for word 1. The write pulse is then generated and will cause only the associative cells 30 for word 1 to be placed in the 0 state, and will leave words 2 and 3 unaltered. The memory system is then returned to Phase I. After entering Phase I the bit positions in the compare register that store a 1, including the masked, 1, Ɨ, will cause the corresponding associative cells 30 to be complemented and the new word stored in the memory will read 0 1 1 0. The new word will be seen to be the same as the old word in bit positions 3 and 4 altered as desired in bit positions 1 and 2.

Another important aspect of the associative memory system is the routine for loading information into the memory, particularly at empty memory locations. The first routine to be considered for loading information into the memory system identifies an empty memory location through the use of all 0's in each bit position. This, of course, eliminates the use of all 0's for any one word. In following this sequence two complete cycles are necessary—the first cycle for locating the empty locations and then writing into the thus identified locations. Accordingly, all 0's are entered into the compare register and the normal compare sequence is followed whereby the matching words are identified and, in the event of multiple matches or where there is more than one empty location, the multiple match resolver is effective to produce the desired sequential operation for operating on one location at a time. After the matching location is determined and the address is stored in the address register 37, the memory system is prepared to accept the word to be written into the designated empty memory location. To this end, the new word is entered into the compare register and it is written into the designated address in accordance with the above described routines. It should be noted that this requires the two cycles since if the new word contains a 1 in any one position an empty location would not be correctly determined by the memory system in accordance with this procedure and, therefore, the compare register must be loaded twice as described.

In order to avoid the use of two loading cycles, another sequence may be utilized for loading information into the memory system. In this routine an empty memory location is identified by an additional bit position and which bit position may signal an empty word location when it is in the 0 state and a used location when it is in the 1 state. To this end, the system described in FIG. 4 would be essentially the same except that an additional associative cell for identifying an empty or used word location will have its write circuitry modified whereby the resistor 18, for example, shown in FIG. 1 will be coupled to the base of the transistor 10 rather than the base of the transistor 11, as shown. Accordingly, for this associative cell only when a write pulse is applied thereto it will cause the associative cell to be placed in the 1 state rather than in the 0 state as in the normal writing sequence. It will be understood then that writing into a word causes all 0's to be written except at this extra bit cell.

To this same end, the compare register will be modified to include an extra compare cell aligned with the extra associative cell in the memory position. This compare register cell will contain a 1 or "don't care" except when looking for an empty location at which time it contains a 0. Furthermore, the entry of a word into the remaining cells of the compare register will not affect the state of the additional cell of the compare register. When the word to be written into the memory system is written into the compare register, it is also necessary to mask each of these bits whether they are 1's or 0's in accordance with this procedure. It should be noted, however, that the extra bit position is not masked. Under these conditions then, since all the cells in the compare register have been set to the "don't care" position, in searching for an empty word location the only cell that is of any significance in the additional cell and it searches the additional memory positions in the system to determine the location of these extra cells that store a 0. Accordingly, after the generation of the clock pulses to place the memory system into Phase II the matching outputs will be detected for indicating the empty word locations and, as mentioned above, if more than one empty location is detected they will be resolved and only one location will be used. The address of the single matching location is entered into the address register 37 and applied to the write gates 45. Accordingly, when a write pulse is applied to the matching word AND circuit 45, each of the associative cells 30 for that word are set to the 0 state except the extra bit cell, which is set to the 1 state. After this writing sequence occurs, then, the system is returned to Phase I and in returning to Phase I the new word in the compare register is written into the empty word location. It should be noted, however, that the extra cell in the compare register stores a 0 and, therefore, does not complement the 1 previously written into the extra bit position for the new word and therefore indicates that the new word has been written into the previously empty location. The system is now prepared to go through any new sequence desired.

Now referring to FIG. 5 another embodiment of the basic associative cell will be described. The associative cell 50 of FIG. 5 allows the "don't care" feature to be utilized and also when such an associative cell is utilized in the memory system a comparison may be obtained in a single step rather than going through the complementing phases previously described.

Referring to the associative cell 50 in particular, it will be noted that once again it is a regenerative cross-coupled transistor switching element or flip-flop. The emitter electrodes of both of the transistors 51 and 52 are connected directly to ground. The collector electrode for the transistor 51 is connected to a voltage terminal identified as the terminal $V_A$ through a voltage dropping resistor 53. In the same fashion the collector electrode for the transistor 52 is connected to a voltage terminal $V_B$ through a similar dropping resistor 54. The base electrodes for the transistors 51 and 52 are also symmetrically connected to the voltage terminals $V_A$ and $V_B$ respectively through the provision of the voltage dropping resistors 55 and 56 connected to the opposite terminals of the resistors 54 and 53 from the terminals $V_B$ and $V_A$, respectively. In addition, a write terminal is identified and connected by means of a resistive element 57 directly to the base electrode for the transistor 51. In addition, a diode gating network which may be considered an OR gate is connected to the collector electrodes of the transistors 51 and 52 and to the output terminal of the associative cell 50. One of the diode elements, the diode 58, is shown connected directly to the collector for the transistor 52 and has its anode electrode connected to the output terminal. In addition, the other diode 59 is connected in the same fashion between the output terminal and the collector electrode for the transistor 51.

The output terminal of the associative cell 50 is connected to a word match detector as in the previous embodiments. The word match detector for the associative cell 50 is generally similar to the one described and illustrated in FIG. 4A with the omission of the resistor 49. The word match detector comprises a transistor 61 having its collector electrode connected to the output terminal $e_0$ and also to a point of negative potential, $-V_1$, through a dropping resistor 62. The emitter electrode for the transistor 61 is connected directly to ground. The base electrode for the transistor 61 is connected directly to the collector electrode of a transistor 63 of the opposite conductivity type from transistor 61. The base electrode for the transistor 63 is connected to a point of negative potential shown as $-1.1_1$, while the emitter electrode is connected directly to the output terminal of the associative cell 50. As it will be made more evident hereinafter, the logic of the present word match detector is inverted from that previously described.

In addition, the compare register will again be considered to comprise a compare cell and a "don't care" cell as in the previous embodiments. In this embodiment, however, the 1 and 0 outputs from the compare cell 23 are each connected to an individual switching amplifier 61 and 62 respectively to raise the level of the output signal from the cell when it indicates a particular state. The amplifier 62 is connected between the 1 terminal of the compare cell 23 and the $V_A$ terminal of the associative cell 50 while the 0 output amplifier 61 is directly connected to the $V_B$ terminal of the associative cell 50.

The 1 output terminal of the "don't care" cell is connected as one of the inputs to individual AND circuits 64 and 65 connected between the 0 and 1 outputs of the compare cell 23 and the amplifiers 61 and 62 respectively. The other inputs to the AND circuits 64 and 62 comprise the 0 and 1 outputs respectively from the compare cell 23.

The voltage output levels derived from the compare register are such that when the compare cell is in the 0 state and the "don't care" cell is in the normal state, providing a true output, the voltage applied to the terminal $V_A$ may be considered to be $-V1$ while that applied to the terminal $V_B$ from the 0 output may be considered to be $-2V1$. This is the voltage relationship since the input conditions for the AND circuit 64 only are met. In the same fashion, when the "don't care" cell is in the normal state and the compare cell is in the 1 state, the voltages applied to the terminals $V_A$ and $V_B$ are $-2V1$ and $-V1$ respectively, since the input conditions of the AND circuit 65 are met. Furthermore, when the "don't care" cell is in the "don't care" state, a false output is provided both of the AND circuits 64 and 65 and the signal, $-V1$, is applied to both terminals $V_A$ and $V_B$.

It will be noted that in this embodiment the output voltages derived from the compare register are arranged to control the voltages applied to the collector electrodes of the transistors of the associative cell 50 and thereby control whether a true or false signal is derived therefrom. The logic of the gating arrangement is such that if both the diodes 58 and 59 are back-biased a true output signal will be derived from the associative cell 50 while if either one of the diodes 58 or 59 conducts current through the output terminal and into the switching circuit proper a false output signal will be obtained.

If it is assumed that the "don't care" cell of the compare register is in the "don't care" state, it will be seen that irrespective of the state of the compare cell 23 that the controlling voltage at the terminals $V_A$ and $V_B$ will be the same. It will also be noted that in order for either diode 58 or 59 to conduct, it requires that current be derived from the transistor 63 of the word match detector and that the cathode electrodes of the diodes 58 and 59 be slightly more negative than the $-1.1V_1$. Therefore, with the application of the voltage $-V1$ to the terminals $V_A$ and $V_B$, it will be slightly more positive than the $-V1$ at the cathode electrodes and, therefore, under this condition neither diode 58 or 59 will conduct and the output terminal $e_0$ will assume a negative potential and a true output signal will be provided. It will be further noted that this is consistent with the above logical notation that a true output is always produced from the associative cell irrespective of the storage state of the compare cell when its associated "don't care" cell is placed in the "don't care" state. Assuming, then, that the "don't care" cell 27 now is in the normal state and the compare cell stores a 1. The voltage conditions then are such that the terminal $V_A$ receives a $-2V1$ potential while the terminal $V_B$ is maintained at a $-V1$ potential from the respective outputs of the compare cell. If at this same time the associative cell 50 stores a 1, the transistor 51 will be fully conducting while the transistor 52 will be cut off. The condition of the transistor 51 will back-bias the associated diode 59 while the collector for the non-conducting transistor 52 is at essentially ground potential, more positive than $-1.1V_1$, and will not allow the diode 58 to conduct whereby the logical conditions are once again satisfied for producing a true output. In the same fashion, when the compare register 23 stores a 1 and the associative cell stores a 0, the voltages applied to the associative cell at the terminals $V_A$ and $V_B$ are $-V1$ and $-2V1$ respectively. Under this set of conditions the transistor 52 is fully conducting while the transistor 51 is cut off. With these current states the diode 58 is allowed to conduct and the output terminal $e_0$ is at ground potential to thereby produce the correct false output signal indicative of a mismatch. The same logical procedures may be examined to determine the output signals when the compare register stores a 0 and the "don't care" cell is in the normal state with the two states for the associative cell 50.

It will be noted from the above description that once the information is entered into the compare register that essentially immediately thereafter the output indication from the associative cell 50 for comparison purposes is indicated and that it merely requires the connecting of each output terminal to a word match detector for a particular word to determine whether a word stored in the compare register matches any word in the memory system. To this end, the memory system would be arranged essentially the same as that described hereinabove in connection with FIG. 4.

I claim:

1. A method for locating a marked location in an associative memory system which system has a compare register containing a reserved compare cell and which system has in each memory location an associative cell reserved for storing a mark, the method comprising the steps of setting the reserved compare cell to a predetermined condition and associatively interrogating the contents of the reserved associative cells for a predetermined correspondence with the content of only the reserved compare cell to cause the associative memory system to form a signal indicative of a marked location.

2. A method for locating and writing information into a storage location in an associative memory which has a compare register associated therewith including the steps of reserving an associative cell and a corresponding compare cell for locating storage locations, setting a predetermined storage condition into the reserved cell of a storage location from which information signals are being read, setting a predetermined storage condition into the reserved compare register cell, associatively interrogating the content of the reserved associative cells with the content of only the reserved compare register cell for a correspondence therebetween to thereby detect an available storage location, writing information signals into the detected storage location and changing the storage condition of the reserved associative cell of the detected storage location to mark the same as containing new information signals.

3. A method for locating a storage location in an associative memory system, which system has a plurality of storage locations each containing a plurality of associative memory cells and which system has a comparison register containing a plurality of compare cells corresponding in number to the number of said plurality of associative memory cells in a storage location, the method including the steps of adding an additional associative memory cell to each storage location, assigning to the additional associative memory cells a preselected state for indicating a marked location, adding an additional compare cell to the comparison register, switching all of the compare cells except the additional compare cell to a "don't care" state, setting the additional compare cell to a state corresponding to said assigned preselected state associatively interrogating the storage locations with the content of said comparison register to determine the presence or absence of a marked location and the location of such marked location whereby only the storage locations having their additional associative memory cell in said preselected state will indicate a marked location.

4. An associative memory system comprising a plurality of memory locations and a compare register, the memory locations and the compare register each having a plurality of storage cells and an additional cell for use in locating a memory location, a preselected state of the additional cell in each memory location providing an indication for such memory location, means for switching all of the cells in the compare register except the additional cell to a "don't care" state, means for switching the additional cell of the compare register to a state corresponding to the preselected state, means for associatively interrogating the memory cells using the content of the compare register, the additional cell in said compare register interrogating the additional cells in each of said memory locations, and means responsive to the interrogation for indicating only a memory location having the additional memory cell in said preselected state.

5. An associative memory system having an associative memory and a compare register therefor, a plurality of cells being provided in each memory location of the memory and in the compare register, a cell being reserved in each memory location of the memory and in the compare register for marking and locating a storage location from which information has already been read, apparatus for locating an available memory location comprising means for setting a predetermined storage condition into the reserved compare register cell, and means for associatively interrogating for a correspondence the content of the reserved cells in the associative memory with the content of only the reserved cell in the compare register, to cause a signal to be formed by the associative memory indicative of the storage location containing the reserved cell in the predetermined condition.

6. An associative memory system having a plurality of associative memory locations and a compare register, a reserved storage cell and additional storage cells being provided in each memory location and in the compare register, means for setting a predetermined storage condition into the reserved cell of a storage location, to indicate the corresponding location is available for storing information means for setting a predetermined storage condition into the reserved compare register cell, means for associatively interrogating the content of the reserved memory location cells with the content of only the reserved compare register cell for a correspondence therebetween to thereby detect an available storage location, means for writing information signals into the additional storage cells of the detected storage location, and means for changing the storage condition of the reserved associative cell of the detected storage location to mark the same as containing new information signals.

References Cited

UNITED STATES PATENTS 2,996,699 8/1961 Kramskoy -------- 340—172.5

3,121,217 2/1964 Seeber Jr. et al. -- 340—172.5X
3,191,155 6/1965 Seeber Jr. et al. ---- 340—172.5
3,195,109 7/1965 Behnke ----------- 340—172.5

PAUL J. HENON, Primary Examiner

H. E. SPRINGBORN, Assistant Examiner

PO-1050
(5/69)

UNITED STATES PATENT OFFICE
CERTIFICATE OF CORRECTION

Patent No. 3,555,515 Dated January 12, 1971

Inventor(s) Edwin S. Lee, III

It is certified that error appears in the above-identified patent and that said Letters Patent are hereby corrected as shown below:

Column 5, line 29, "state restore" should be --state and restore--

Column 6, line 23, "dont" should be---don't--

Column 8, line 31, "statte" should be --state--

Column 10, line 22, "associate" should be --associative--

Column 13, line 15, "1 and 4" should be --1 to 4--

Column 13, line 56, "Until" should be --Under--

Column 14, line 6, "read 01" should be --read 10--

Column 14, line 13, "011∅" should be --01/∅--

Column 16, line 21, "$-1.1_1$" should be --$1.1V_1$--

Signed and sealed this 6th day of July 1971.

(SEAL)
Attest:

EDWARD M.FLETCHER,JR.
Attesting Officer

WILLIAM E. SCHUYLER, JR.
Commissioner of Patents